Patented July 17, 1923.

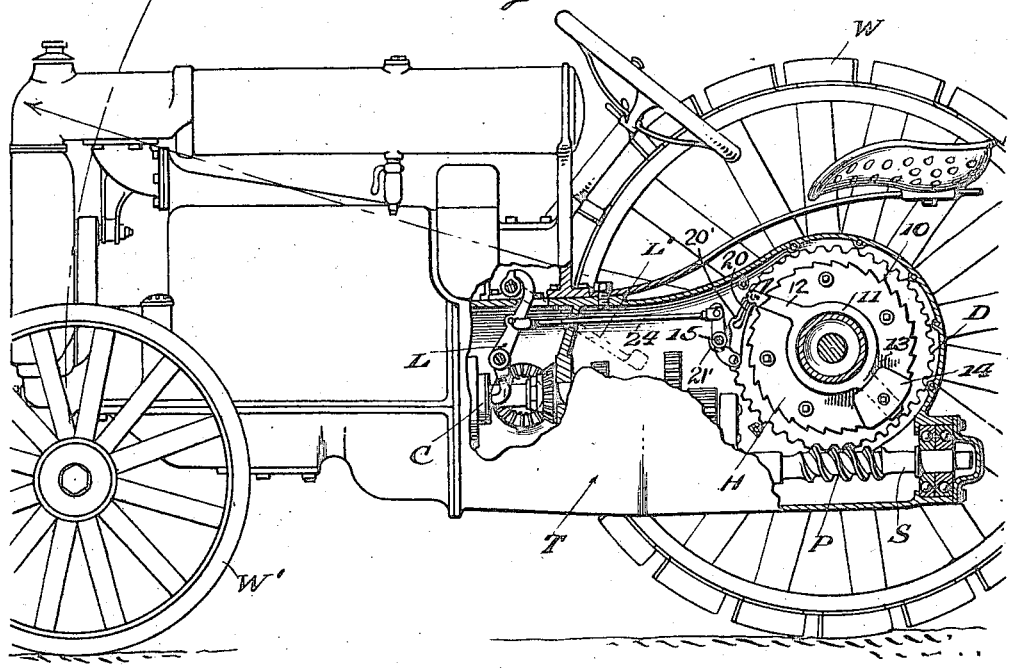

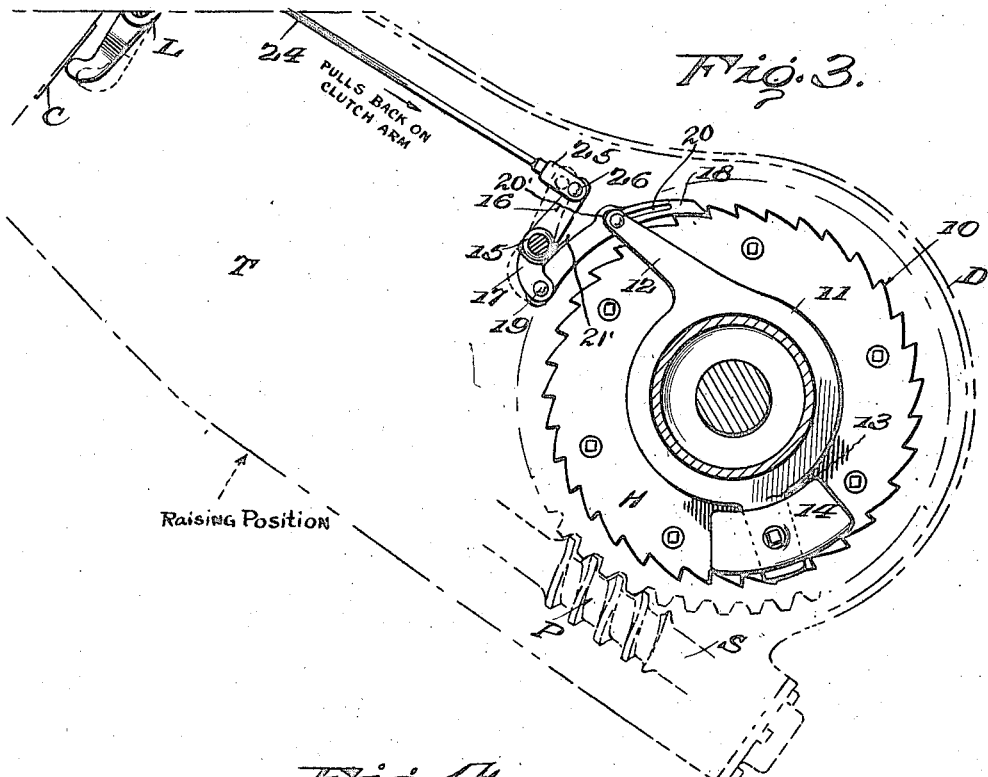
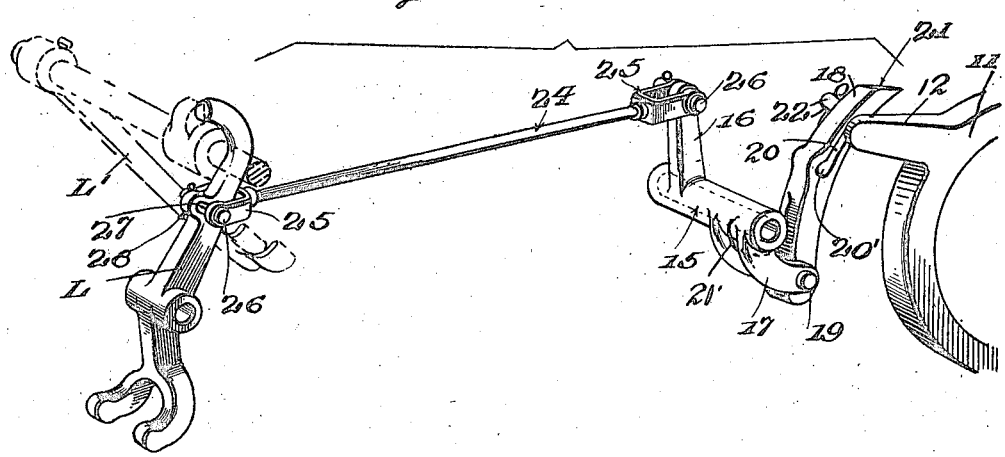

1,462,451

UNITED STATES PATENT OFFICE.

HARRY M. GREASLEY, OF CORRY, PENNSYLVANIA.

ATTACHMENT FOR TRACTORS.

Application filed December 21, 1921. Serial No. 523,962.

*To all whom it may concern:*

Be it known that I, HARRY M. GREASLEY, a citizen of the United States, and a resident of Corry, in the county of Erie and State of Pennsylvania, have invented certain new and useful Improvements in Attachments for Tractors, of which the following is a specification.

This invention relates to an attachment for tractors, and more particularly to an attachment adapted to operate for preventing a wheeled tractor from turning backwards upon the rear drive wheels being held against rotation.

It is of common knowledge that tractors, and especially of the wheeled type, upon the rear driving wheels being stuck in a roadway or field or in some other way held against turning, should the drive shaft not be disconnected from its source of power, the drive pinion or worm carried thereby will rotate about the worm wheel of the associated differential and lift the forward end of the tractor and turn the tractor backwards. In such a case, that is, when the tractor turns backward, the body of the tractor rotates about the differential housing and its worm wheel.

With the above in mind it is the object of the present invention to utilize the movement of the tractor body or frame of the tractor when said tractor is turning backwards for operating mechanism adapted to stop the power to the driving shaft of the tractor.

A further object of the invention is that the parts of the operating mechanism for disconnecting the driving shaft from its source of driving power be extremely simple and adapted to be applied to any type of wheeled tractor.

Other objects and objects relating to details of construction, combination and arrangement of parts will hereinafter appear in the detailed description to follow.

The invention is illustrated by way of example in the accompanying drawings, in which:

Figure 1 is a view in side elevation of a tractor with parts broken away to illustrate the application of the invention, Figures 2 and 3 are diagrammatic sectional views illustrating the normal position of the apparatus and its operative position, respectively, Figure 4 is a detailed perspective view more clearly illustrating the operative parts of the apparatus of the invention.

Referring to the drawings more particularly, W indicates the usual rear drive wheels of the tractor, W' the front wheels, T the body or transmission casing which in this instance encloses the differential unit including its worm wheel, D, and also extends forward to enclose the driving shaft and associated mechanism and the clutch C, which serves for disconnecting the driving shaft S from its source of driving power or in other words the engine located at the forward end of the tractor. The driving shaft in this instance carries a worm pinion P which is in constant mesh with the worm wheel D of the differential.

In carrying out the present invention, upon one side of the differential housing there is secured a ratchet gear H. The teeth 10 of the ratchet gear should point in the direction shown in the drawings. Upon the associated hub portion of the same differential housing there is positioned a band or ring as generally indicated at 11. Preferably the hub should be machined, to form a good bearing surface for the inner periphery of the ring 11. The ring 11 has formed therewith a pair of arms 12 and 13. The arm 13 carries a weight 14 which is adapted to urge the ring 11 to rotate in a right hand direction.

As is well known, the transmission housing of this type is usually made of two sections which are secured together by suitable bolts. In the present instance, one of these bolts which is positioned forward of the differential is utilized for rotatably supporting a sleeve 15. The sleeve is disposed between the transmission housing as illustrated in Figure 1, and has formed adjacent one end an arm 16, and adjacent its other end the pair of arms 17. The arm 16 preferably extends radially from the sleeve while the arms 17 are slightly curved as best shown in Figure 4 of the drawings. The sleeve 15 together with its arms 16 and 17 may be referred to as a bell crank lever. Between the free ends of arms 17, there is pivoted the one end of the pawl 18 by the means of a pin as at 19. The pawl 18 is arcuate in shape as shown and intermediate of its ends is formed with a slot 20 extending longitudinally thereof and conforming to the curvature of the pawl. The slot terminates at its rear end in an enlargement 20'. The forward end of the pawl is pointed as at 21. The arm 12 of the ring 11 has a bolt 22 extending from its free end, said bolt extending through the slot 20 of pawl 18. The pawl may be held upon the bolt 22 by a cotter pin as shown. A spring 21' normally presses the pawl 18 toward the ratchet gear teeth 10.

The clutch C of the tractor is of a well known form and is adapted for disconnecting the shaft S from the engine of the tractor upon the upper portion of the lever L swinging rearwardly. That is usually accomplished by the driver of the tractor through the means of a foot lever as indicated at L'. Normally the lever L is formed to remain in its forward position and the clutch C at this time is in its position for connecting the driving shaft S with the engine of the tractor.

In the present instance, a connecting rod 24 is extended between the arm 16 of the sleeve 15 and the clutch lever L, said rod being pivotally connected at each end by the means of a clevis 25 and pin 26 to the arm 16 and lever L, respectively. The pin 26 of the forward connecting clevis 25 is disposed in a slot 27, which is inclined as shown and extends slightly forwardly with respect to the lever L and into the enlargement 28 formed upon said lever.

In the use of the present invention, when the tractor is normally operated, that is, proceeding forwardly, the parts are positioned as illustrated in Figures 1 and 2. The ring 11 is held stationary while the associated hub of the differential housing turns therewithin. The reason the ring is held stationary is due to the weight 14 which continuously urges the ring to maintain this position. The pin 22 which connects the arm 12 to the pawl 18 is positioned in the upper end of the slot 20 and the pin 26 which connects the connecting rod 24 with the clutch lever L is positioned in the rear end of the slot 27. By this arrangement if it is desired by the operator to disconnect the driving shaft S from the engine of the tractor, he may press downwardly upon the pedal L' which will in turn move the upper portion of the clutch lever L rearwardly for opening the clutch C. This operation will be permitted without in any way affecting the mechanism of the present invention.

Should the rear wheels W of the tractor become stalled in the field or roadway and the driving shaft S still be permitted to rotate, then the worm drive P of the driving shaft will start to travel about the worm wheel D of the differential and raise the front end of the tractor. As seen the body of the tractor will rotate about the worm wheel D, the worm wheel D being held stationary due to the refusal of the wheels W to turn. Upon the tractor turning backward, the weight 14 will rotate therewith until it assumes the position shown in Figure 3, at which moment the weight will have reached its balanced position, and then the ring will slightly resist further turning movement whereupon the bolt 22 will move forwardly in slot 20 and when this bolt enters the enlargement 20', the spring 21' will cause the pawl to positively engage one of the ratchet teeth 10, whereupon the arm 17 of the bell crank lever 15 will be moved forwardly and the arm 16 rearwardly, and thus in turn pulling rearwardly upon the rod 24 for drawing the clutch lever L rearwardly and disconnecting the clutch C so that the driving shaft S will be disconnected from the engine of the tractor. Upon this occurring, the forward end of the engine will of course drop by gravity to its normal position and thus avoid any catastrophe.

While I have herein shown and described only one form of tractor embodying my invention, it is to be understood that I am aware that by slight changes and modifications the same may be easily applied to other forms of tractors without departing from the spirit of the invention, as indicated by the appended claims.

I claim:—

1. In a tractor of the character described, a ratchet gear carried by the rear axle structure of said tractor, a bell crank lever fulcrumed upon the frame of the tractor, a pawl connected to said bell crank lever and adapted to be brought to engage the ratchet wheel, means adapted to normally hold the pawl out of engagement with said ratchet gear, said means being also adapted to permit the pawl to engage the ratchet gear upon the tractor turning about the rear axle as a pivot, and means connected with the bell crank lever whereby when the same is actuated the driving power of said tractor will be rendered inoperative.

2. In a tractor of the character described, a racthet gear carried by the rear axle structure of said tractor, a bell crank lever fulcrumed upon the frame of the tractor, a pawl connected to said bell crank lever and adapted to be brought into engagement with said ratchet gear, an unbalanced member carried by the rear axle and adapted to engage the pawl for normally holding the same out of engagement with said ratchet wheel and also adapted upon the body of the tractor turning about the rear axle as a pivot to permit said pawl to engage the ratchet wheel, and means associated with the bell crank lever for rendering the bell crank lever of the tractor inoperative upon said pawl being engaged by the ratchet wheel.

3. In a tractor of the character described, a ratchet gear carried by the rear axle structure of said tractor, a bell crank lever fulcrumed upon the frame of the tractor, a pawl having its one end pivoted to said bell crank lever and adapted to engage the ratchet gear with its other, a ring rotatably supported by the rear axle, a weight adapted to urge the ring to rotate in one direction, means extending from said ring adapted to normally hold the pawl out of engagement with the ratchet gear and also adapted upon the body of the tractor turning about the rear axle as a pivot and the ring assuming a balanced position to permit said pawl to engage the ratchet gear, and means associated with the bell crank lever adapted to render the driving power of the tractor inoperative upon said pawl being engaged by the ratchet gear.

4. In a tractor of the character described, a ratchet gear carried by the rear axle structure of said tractor, a bell crank lever fulcrumed upon the frame of the tractor, a pawl having its one end pivoted to said bell crank lever and adapted to engage the ratchet gear with its other end, a ring rotatably supported by the rear axle, a weight adapted to urge the ring to rotate in one direction, a finger extending from said ring and carrying a bolt at its outer end extending through a slot in said pawl, said slot of the pawl being elongated and terminating at its one end in an enlargement, said finger of the ring being adapted to normally hold the pawl out of engagement with the ratchet gear, and upon the body turning about the rear axle as a pivot and the ring assuming a balanced position to permit the pawl to move to a position for bringing the bolt carried by said finger into the enlargement of said slot in the pawl and thereby permit the pawl to engage the ratchet gear, and means associated with the bell crank lever adapted to render the driving power of said bell crank lever inoperative upon said pawl being engaged by the ratchet gear.

5. In a tractor of the character described, a ratchet gear carried by the rear axle structure of said tractor, a bell crank lever fulcrumed upon the frame of the tractor, a pawl having its one end pivoted to said bell crank lever and adapted to engage the ratchet gear with its other end, a ring rotatably supported by the rear axle, a weight adapted to urge the ring to rotate in one direction, a finger extending from said ring and carrying a bolt at its outer end extending through a slot in said pawl, said slot of the pawl being elongated and terminating at its one end in an enlargement, said finger of the ring being adapted to normally hold the pawl out of engagement with the ratchet gear, and upon the body turning about the rear axle as a pivot and the ring assuming a balanced position to permit the pawl to move to a position for bringing the bolt carried by said finger into the enlargement of said slot in the pawl and thereby permit the pawl to engage the ratchet gear, a spring for causing said pawl to positively engage the teeth of said ratchet gear, and means associated with said bell crank lever adapted to render the driving power of said tractor inoperative upon the pawl being engaged by the ratchet gear.

6. In combination with a motor vehicle, a counter-balanced ring rotatably supported upon the rear axle structure thereof, and means associated therewith whereby to render the driving power of the tractor inoperative upon the body thereof turning about the rear axle as a pivot a predetermined degree.

7. In a tractor of the character described, an unbalanced ring rotatably supported by the rear axle structure of the tractor, an arm extending from said ring and shiftably supporting a pawl, a ratchet gear carried by the rear axle structure and turnable therewith, a connection between said pawl and body of motor vehicle whereby the pawl will be shifted upon the finger of said ring for engaging the ratchet gear wheel when the body of the tractor turns about the rear axle as a pivot to bring the ring to a balanced position, and means associated with the connecting means between said pawl and tractor body whereby the driving power of said tractor will be rendered inoperative when said pawl engages the ratchet gear.

8. In a tractor of the character described, in combination, a ratchet wheel carried by the differential unit, a bell crank lever fulcrumed and carried by the frame of the tractor, a pawl having its one end pivoted to an arm of said bell crank lever and its other end disposed to be brought into engagement with the teeth of said ratchet wheel, means adapted to normally hold the pawl from engagement with the teeth of said ratchet wheel and said means being also adapted to permit the engagement of the pawl with the ratchet teeth upon backward turning movement of the tractor a predetermined degree, and means connected to the other arm of said bell crank lever adapted to be operated by the pressure against the pawl occasioned by the backward turning movement of the tractor for operating to open the clutch connecting said driving shaft with its driving power.

9. In combination with a motor vehicle, an unbalanced member carried thereby adapted to assume a balanced position upon the motor vehicle turning upon its rear axle as a pivot a predetermined degree, and means associated with said member whereby the driving power of said motor vehicle may be rendered inoperative upon said member assuming its balanced position.

10. In a tractor of the character described, in combination, a ratchet wheel carried by the differential housing concentric to the worm wheel of the differential unit, a bell crank lever fulcrumed and carried by the frame of the tractor, a pawl having its one end pivoted to an arm of said bell crank lever and its other end disposed to be brought into engagement with the teeth of said ratchet wheel, a ring turnably supported by the differential housing, a pair of arms extending from the said ring adapted to unbalance the same, connecting means between one arm of the ring and the pawl adapted to normally hold the pawl out of engagement with the teeth of said ratchet wheel and also adapted upon the backward turning movement of the tractor and the ring becomes balanced to permit the pawl to engage the ratchet teeth, and means connected with the other arm of the bell crank adapted upon the bell crank being operated by the pressure applied against the pawl upon engaging the teeth of the ratchet wheel with the backward turning movement of the tractor to disconnect the driving shaft from its driving power.

11. In combination with a motor vehicle, an unbalanced ring journaled upon the rear axle of said motor vehicle and adapted to assume a balanced position upon the motor vehicle turning upon its rear axle as a pivot a predetermined degree, and means associated with the ring whereby the driving power of the motor vehicle will be rendered inoperative upon said ring reaching its balanced position.

HARRY M. GREASLEY.